July 15, 1958    L. M. ROBINSON ET AL    2,843,144
LIQUID LEVEL DEVICE
Filed April 14, 1955

INVENTORS
L. M. ROBINSON
V. L. HINING
BY
Hudson & Young
ATTORNEYS

United States Patent Office 2,843,144
Patented July 15, 1958

2,843,144

LIQUID LEVEL DEVICE

Lorne M. Robinson, San Francisco, Calif., and Verdus L. Hining, Houston, Tex., assignors to Phillips Petroleum Company, a corporation of Delaware Application April 14, 1955, Serial No. 501,254

2 Claims. (Cl. 137—395)

This invention relates to a liquid level indicating system. In another aspect, it relates to a control device or alarm actuated by such liquid level indicator.

Heretofore, liquid levels in closed tanks have ordinarily been measured by sight gauges in which the liquid level is the same as that existing in the tank, the sight gauge being arranged outside the tank to visually display the liquid level.

Where the fluid in the tank is corrosive, breaking of the sight gauge produces a distinct hazard due to leakage or spraying out of the corrosive fluid. Moreover, it is difficult to obtain accurate readings with the usual sight gauge where the liquid whose level is to be indicated is dirty, and oftentimes difficult to read due to the color, or lack of it, of the material in the tank. Certain liquids coat the interior of the gauge glass and further make the reading difficult. These difficulties are accentuated where the tank is a closed one, and the materials stored therein have a high vapor pressure.

In accordance with this invention, the foregoing difficulties and shortcomings of sight gauges are overcome by providing pressure-sensing devices within the tank each of which has a flexible portion arranged so that the volume of the device varies in accordance with the external pressure thereon. One of these devices, which can be a bellows or flexible bag, is immersed in a lower liquid phase within the tank, preferably at the bottom thereof, while the other device is located in the vapor space or lighter liquid phase above the lower liquid phase, preferably close to the top of the tank. These devices are connected to the opposite ends of an external sight gauge which is partially filled with a liquid, usually different from that stored in the tank. As the level changes, the differential pressure between these devices varies in accordance therewith and changes the level of the liquid in the sight gauge. In this manner, if the sight gauge breaks, no liquid from the interior of the tank is released with resulting hazards in the case of explosive or corrosive materials. Moreover, the liquid in the sight gauge can have any desired distinctive color so that it is easy to read, and the densities of the liquid and vapor in the sight gauge system can be adjusted to provide a large variation in the level in the sight gauge responsive to a small variation in liquid level within the tank. Finally, difficulties resulting from boiling of the liquid within the sight gauge are eliminated, and material can be selected which will not coat the walls of the sight gauge.

In one embodiment of the invention, the liquid level is indicated by a pressure gauge mounted in a sealed vessel, the upper and lower portions of the tank being connected, respectively, to the pressure gauge and vessel containing it. This provides a convenient system for reading the level in the tank at a remote location.

In either of the above cases, suitable alarm or control apparatus can be actuated responsive to changes in liquid level.

Accordingly, it is an object of the invention to provide a liquid level indicating system of improved character.

It is a further object to provide an alarm or control system actuatable by such liquid level indicator.

It is a still further object to provide a liquid level indicating system which is easy to read, accurate, reliable, of low cost, and in which variations in liquid level within the tank can be magnified for easier and more accurate reading.

Various other objects, advantages and features of the invention will become apparent from the following detailed description taken in conjunction with the accompanying drawings, in which.

Figure 1:
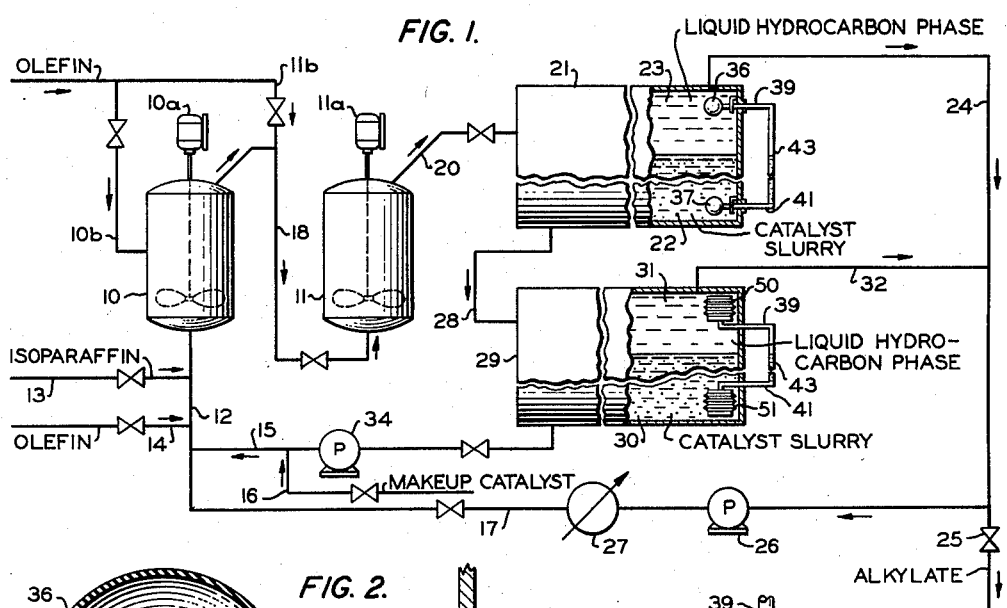
Figure 1 is a flow diagram of the liquid level indicating system of this invention as applied to a system for catalytic alkylation.

Referring now to Figure 1, we have shown a system for alkylating olefins and isoparaffins including two series-connected reaction vessels 10 and 11. Feed enters the vessel 10 through a conduit 12 to which is admitted an isoparaffin feed stock and an olefin feed stock through valved lines 13 and 14, respectively. A catalyst complex, such as an aluminum chloride-hydrocarbon complex, is pumped into conduit 12 through a line 15, and fresh make-up catalyst enters the line 15 through a valved line 16. Hydrocarbon material is also recycled and passed to the conduit 12 through a valved line 17.

Both reaction vessels are stirred and, to this end, are provided with agitating mechanism 10a and 11a. The material from vessel 10 passes through a line 18 to the vessel 11, and fresh olefin feed is added to the vessels 10 and 11 through valved lines 10b and 11b.

The alkylated product, together with suspended catalyst, passes through a valved line 20 to a tank 21 wherein there is maintained a catalyst phase or slurry 22 and an upper hydrocarbon phase 23. The phase 23 is withdrawn through a line 24 and passed either to product storage through a valved line 25 or to the recycle line 17 through a pump 26 and a cooler 27. The heavier phase 22 passes through a line 28 to a second tank 29 which also contains a catalyst phase or slurry 30 and an upper hydrocarbon phase 31. The phase 31 is withdrawn through a line 32 which joins line 24, and the catalyst phase 30 is withdrawn through a valved line 33 and a pump 34 to the catalyst recycle line 15.

It is important that a proper liquid level be maintained in the tanks 21 and 29, and the material is such that the ordinary type of sight gauge becomes coated with catalyst and is very difficult to read. Moreover, with an ordinary type sight gauge, the corrosive catalyst mixture is discharged over the surrounding area with resultant hazards, both from the corrosive nature of the catalyst material and the flammable nature of the hydrocarbon components, in the event of breakage of the sight glass.

In accordance with this invention, I provide closed pressure-sensing devices within the tank which communicate with the respective ends of the sight glass or sight gauge. In the case of tank 21, these devices take the form of flexible bags 36 and 37, Figures 1 and 2, the lower bag 37 being immersed in the slurry or liquid, preferably at the bottom of the tank, as shown. The upper bag 36 is within the lighter hydrocarbon phase preferably at the top of the tank, as shown.

Figure 2:
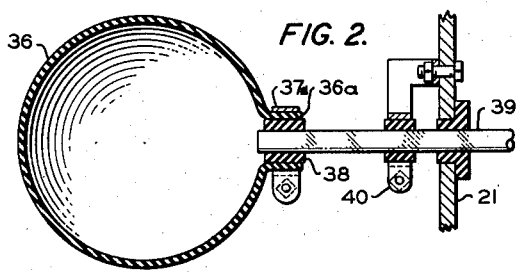
Figure 2 is a detailed view of a flexible bag suitable for use in the system of Figure 1.

The two flexible bags have generally the same construction, that of the flexible bag 36 being shown in Figure 2 where it will be observed that the edges 36a defining an opening in the bag are secured by fixtures 37a to a member 38 which fits upon the outer end of a pipe 39, this pipe being secured to the tank by a clamp 40. The pipe 39, and a corresponding pipe 41 attached to the bag 37, extend through the walls of the tank and are attached, respectively, to the upper and lower ends of a sight glass or gauge 43 external to the tank.

The lower part of the gauge 43, the pipe 41 and the device 37 or 51 are filled with a suitable liquid, such as mercury, ethyl alcohol, carbon tetrachloride, and the like, preferably of the same density as that of the lower phase 22. A suitable dye can be added, if desired. The upper part of the gauge 43, the pipe 39 and the device 36 or 50 contains a vapor such as air. Alternatively, a liquid lighter than and immiscible with that in the lower part of the gauge can be used, preferably a liquid of the same density as the upper phase 23.

Accordingly, as the level of the heavier phase 22 is raised and lowered, the pressure on flexible bag 37 is increased and decreased in a corresponding manner with the result that the level of liquid in tube 43 raises and lowers in accordance with the level of the lower phase 22. Ordinarily, the tank 21 is operated under a high pressure, and variations in this tank pressure are compensated for by expansion or contraction of the flexible bag 36 at the top of the tank. Such variations in tank pressure would otherwise cause a faulty and inaccurate reading of the instrument.

It will be evident that the described structure achieves the important advantages of the invention. Thus, should the tube 43 break, none of the corrosive or flammable material in the tank 21 will escape. Moreover, by adjusting the flexibility of the bags, the type of liquid in the tube 43, and the size of the parts, a relatively small variation in level in the tank 21 can produce a large variation in the level of tube 43, thereby permitting a very accurate reading of the level to be obtained. Finally, the liquid in tube 43 can be of a distinctive color so that the gauge is easily and accurately read.

Figure 3:
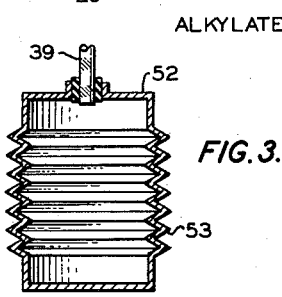
Figure 3 is a view of a bellows suitable for use in the system of Figure 1.

A generally similar arrangement is provided for the tank 29 except that bellows units 50 and 51 replace the respective flexible bags 36 and 37. As shown in Figure 3, each bellows unit has a rigid plate 52 fixed to the adjacent pipe 39 or 41, an expansible bellows 53 being attached to the plate so that the bellows expands and contracts responsive to changes in pressure of the fluid within the tank. It will be evident that this structure permits accurate measurement of the liquid level in the manner indicated in connection with tank 21, and has the same advantages.

Figure 4:
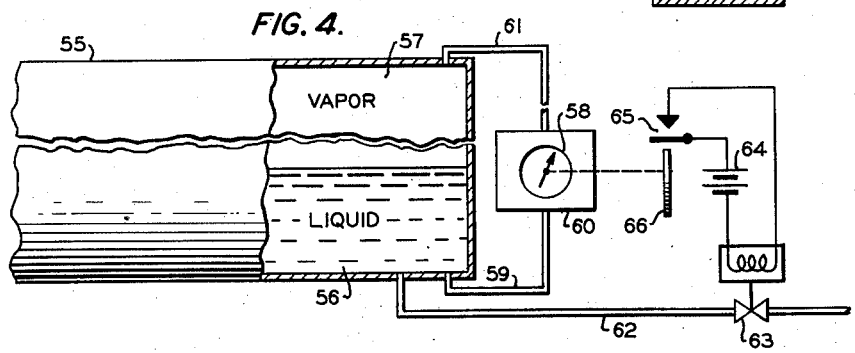
Figure 4 is a view of a tank embodying a modified form of liquid level indicating system.

In Figure 4, we have illustrated the application of the invention to a closed tank 55 containing a liquid 56, the space above the liquid being occupied by vapor 57 which is at least in part the vapor of the liquid 56 and exerts pressure against the walls of the tank.

The tank can advantageously contain, as the liquid, a hydrocarbon stock containing a dirty material, such as tar. For example, the tank can contain the effluent from the thermal treatment of butane and propane. Another application to which the invention can be advantageously applied is in the storage of normal butane or caustic solution in the caustic treatment of hydrocarbons. Still another important application is the measurement of the level of a catalyst complex in the catalytic isomerization of hydrocarbons.

In the embodiment shown, a pressure gauge 58 is connected by a tap or line 59 to the bottom of the tank, the pressure gauge being enclosed within a sealed container 60 which communicates with the top of the vessel by a tap or line 61. The tube 59 can be filled with liquid or contain air, and it can have a diaphragm to prevent plugging of the line. As the liquid level rises or falls in the tank, the pressure read by the gauge increases or decreases in a proportionate manner, thereby indicating the liquid level. The pressure tap 61 extending to the top of the vessel prevents changes in the vapor pressure of the liquid due, for example, to changes in temperature from influencing the reading of the gauge.

In one embodiment of the invention, the indication of the gauge 58 is used to control the rate of withdrawal of liquid from the tank so as to maintain a constant liquid level therein. To this end, liquid is withdrawn from the tank through a conduit 62 controlled by a solenoid valve 63. The solenoid of valve 63 is connected in circuit with a battery 64 and a set 65 of contacts which are actuatable by a cam 66 mechanically connected to the pointer of the pressure gauge 58. When the liquid level in the tank rises above a predetermined value, cam 66 closes the contacts 65, thereby opening valve 63 and permitting liquid to flow from the tank until a predetermined liquid level is established therein.

The modification of Figure 4 permits the liquid level indicating instrument to be mounted remotely from the tank, causes the liquid level to be accurately indicated, and provides automatic control of liquid level in the tank.

Figure 5:
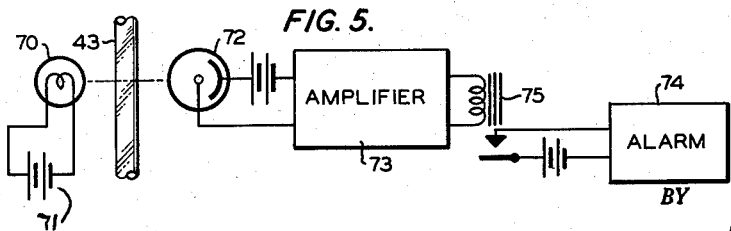
Figure 5 is a view illustrating an automatic alarm system applicable to the liquid level indicator of Figure 1.

In Figure 5, we have shown the manner in which the control system of Figure 1 can be caused to sound an alarm in the event that the liquid level rises or falls above or below a predetermined value. In this embodiment, a light source 70, energized by a battery or other current source, projects a beam of light through the gauge or sight tube 43 whence it impinges upon a photoelectric cell 72. The cell 72 is connected to the input of an amplifier 73, the output of which energizes an alarm 74 through a relay 75. Thus, when the liquid level in tube 43 rises, the path of the light beam is interrupted, and the alarm 74 is sounded. Conversely, the system can be adjusted so that the alarm is in the off position when the light beam is interrupted by liquid in the gauge glass 43. In this event, when the liquid level drops below the path of the beam, the photoelectric cell is energized and the alarm is sounded by operation of amplifier 73 and relay 75.

In this manner, the apparatus of Figure 1 can be used to sound an alarm or, alternatively, the output of the amplifier can be applied through suitable servo-mechanism to control mechanism of the process so as to regulate the process automatically in accordance with the liquid level in the tank 21 or 29.

While the invention has been described in connection with the present, preferred embodiments thereof, it is to be understood that this description is illustrative only and is not intended to limit the invention.

We claim:

1. In a liquid level indicating system, in combination, a closed tank having a liquid therein whose level is to be measured, the space in said tank above said liquid being occupied by a lighter fluid, a gas-tight vessel, a pressure gauge mounted therein having an indicating pointer, lines connecting the respective top and bottom regions of said tank to the pressure gauge and to said vessel, whereby the reading of said pressure gauge is indicative of the liquid level in said tank, a conduit connected to said tank to withdraw liquid therefrom, a solenoid valve in said conduit, a cam mechanically connected to the indicator of said pressure gauge, and a cam switch actuated by said cam and connected in circuit with said solenoid valve to open same when the liquid in said tank rises above a predetermined level.

2. The liquid level indicating system of claim 1 wherein said liquid is a hydrocarbon stock containing tar.

References Cited in the file of this patent

UNITED STATES PATENTS

| | | |
|---|---|---|
| Re. 23,983 | Lupfer | Apr. 19, 1955 |
| 1,670,313 | Oswald | May 22, 1928 |
| 2,215,660 | Brown et al. | Sept. 24, 1940 |
| 2,490,627 | Hofberg | Dec. 6, 1949 |